United States Patent Office 3,637,802
Patented Jan. 25, 1972

3,637,802
HYDROXY-DIALKYLBENZYLTHIOALKANOATES
Heinz Eggensperger, Gadernheim over Bensheim, Volker Franzen, Heidelberg, Horst Muller, Furth-Odenwald, and Hans Stephan, Bensheim, Bergstrasse, Germany, assignors to Deutsche Advance Produktion G.m.b.H., Lautern am Odenwald, Germany
No Drawing. Filed Aug. 17, 1967, Ser. No. 661,213
Claims priority, application Germany, Aug. 18, 1966, D 50,874
Int. Cl. C07c 149/40
U.S. Cl. 260—470                 7 Claims

ABSTRACT OF THE DISCLOSURE

Compounds of the formula

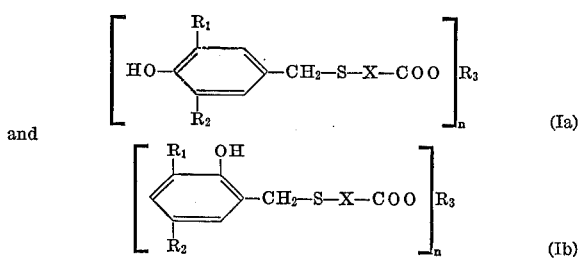

are used as stabilizers for organic compositions. In the formulae:

$n$ is an integer from 1 to 4
$R_1$ and $R_2$ are alkyl
$R_3$ for $n=1$ is a member of the group consisting of thioether, ether, and alkyl radicals and for $n=2-4$ an alkylene group, and
X is alkylene.

---

This invention relates to novel mercaptocarboxylic acid esters and to organic compounds stabilized therewith.

The new mercapto carboxylic acid esters are (hydroxydialkyl-benzyl) mercapto alkane-carboxylic acid esters of the formulae

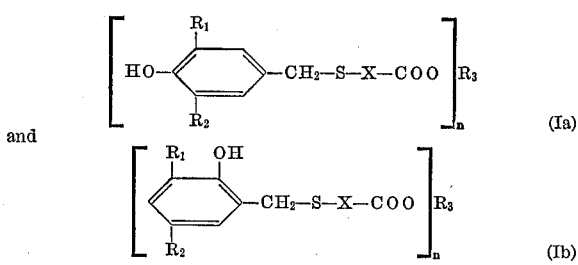

wherein $n$ is an integer from 1 to 4, $R_1$ and $R_2$ are the same or different linear or branched alkyl groups having preferably 1 to 6 C atoms,
$R_3$ is a linear, branched or cyclic thioether, ether, or alkyl group (if $n=1$) or an alkylene group (if $n=2-4$), containing 1–20 C atoms, whereby said groups may be substituted, and
X is a linear or branched lower alkylene group.

The compounds of the invention are useful as stabilizers against photochemical, thermochemical, and oxidative degradation of polymeric resins such as polyolefins, polyamides, shock-resistant polystyrene-containing butadiene-styrene polymers, ABS polymers (copolymers of acrylonitrile, butadiene, and styrene), vegetable and animal oils and fats, plasticizers such as phthalates, and mineral oils.

Generally, we prefer the esters of higher alcohols, particularly those which contain sulfur in form of a thioether group. Such esters are compatible with polymeric resins, fats and mineral oils and exert, due to their low volatility, a good stabilizing effect on these materials even after prolonged thermal stresses.

Particularly good results are obtained with compounds of the formula

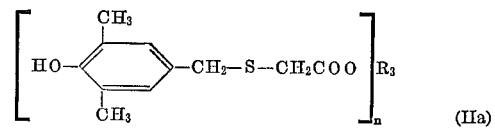

wherein $R_3$ for $n=1$ is a linear, branched, or cyclic alkyl, thioether, or ether group, which may be substituted, and which contains a total of 8 to 20 C atoms; for $n=2-4$ $R_3$ is a linear, branched or cyclic alkylene, thioether, or ether group which may be substituted and which contains a total of 2–10 C-atoms.

Those compounds of this group in which $n=1$ and $R_3$ contains 12 or more carbon atoms, are physiologically harmless and therefore suitable for the stabilization of edible fats or oils and for food wrappings. (4-hydroxy-2,6-dimethyl-benzyl) thioglycolic acid stearyl ester ($R_3=C_{18}H_{37}$), e.g., has shown to be completely untoxic in rat feeding tests.

Generally, the stabilizers of the invention are used in amounts of 0.001 to 10 percent, preferred 0.05 to 5%, calculated on the total weight of the material to be stabilized.

The new compounds of the invention can be prepared by various methods. We prefer the following procedures:
(1) The reaction of Mannich bases of the general formula

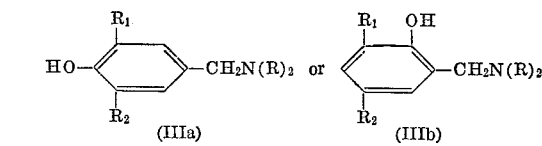

wherein $R_1$ and $R_2$ have the significance given above, and R is a preferably lower alkyl group, with mercaptoacid esters in a dry inert organic solvent such as toluene, or with an alcohol corresponding to the $R^3$ residue, in the presence of a catalytic amount of a base, preferably an alkali metal or alkaline earth metal alcoholate, or
(2) the reaction of the respective dialkyl phenols with mercaptoacids and formaldehyde, or formaldehyde developing substances, in an inert solvent or lower alcohol in the presence of a base, preferably an alkali metal or alkaline earth metal alcoholate, and esterification of the thus obtained acids.

Said preparation methods furnish the new compounds in yields of 70 to 95 percent.

Some examples of compounds corresponding to Formula Ia are given in Table I, and examples of compounds corresponding to Formula Ib are given in Table II.

TABLE I

| $R_1$ | $R_2$ | X | $n$ | $R_3$ | Melting point (° C.) | Stabilizer numeral |
|---|---|---|---|---|---|---|
| $CH_3$ | $CH_3$ | $-CH_2-$ | 1 | $-C_{20}H_{41}$ | 54–56 | |
| $CH_3$ | $CH_3$ | $-CH_2-$ | 1 | $-C_{17}H_{37}$ | 52–53 | I |
| $CH_3$ | $CH_3$ | $-CH_2-$ | 1 | $-\overset{}{C}-\overset{C_2H_5}{\underset{}{C}}-C_4H_8$ | (¹) | |
| $CH_3$ | $CH_3$ | $-CH_2-$ | 1 | $-C_{10}H_{21}$ | (¹) | II |
| $CH_3$ | $CH_3$ | $-CH_2-$ | 1 | $-CH_2CH_2OC_4H_9$ | (¹) | |
| $CH_3$ | $CH_3$ | $-CH_2-$ | 1 | $-CH_2CH_2SC_2H_5$ | (¹) | III |
| $CH_3$ | $CH_3$ | $-CH_2-$ | 2 | $-(CH_2)_4-$ | 75 | IV |
| $CH_3$ | $CH_3$ | $-CH_2-$ | 2 | $-CH_2-\underset{C_2H_5}{\overset{C_2H_5}{C}}-CH_2-$ | 80–82 | |
| $CH_3$ | $CH_3$ | $-CH_2-$ | 4 | $-CH_2-\underset{CH_2-}{\overset{CH_2-}{C}}-CH_2-$ | (²) | |
| Isopropyl | Isopropyl | $-CH_2-$ | 1 | $-C_{18}H_{37}$ | 45–47 | V |
| $CH_3$ | Tert-butyl | $-CH_2-$ | 1 | $-C_{18}H_{37}$ | 44–46 | |
| Tert-butyl | do | $-CH_2-$ | 1 | $-CH_3$ | 57–59 | |
| Do | do | $-CH_2-$ | 1 | $-\langle H \rangle$ | (¹) | |
| Do | do | $-CH_2-$ | 1 | $-CH_2-\langle\rangle$ | 50–51 | |
| Do | do | $-CH_2CH_2-$ | 1 | $-C_{18}H_{37}$ | 38–41 | |
| Do | do | $-\underset{CH_3}{\overset{}{CH}}-$ | 1 | $-C_{18}H_{37}$ | (¹) | |

¹ Liquid. ² Viscous resin.

TABLE II

| $R_1$ | $R_2$ | X | $n$ | $R_3$ | Melting point (° C.) | Stabilizer Numeral |
|---|---|---|---|---|---|---|
| $CH_3$ | $CH_3$ | $-CH_2-$ | 1 | $-C_{18}H_{37}$ | 66–68 | |
| $CH_3$ | tert-butyl | $-CH_2-$ | 1 | $-C_{18}H_{37}$ | 68–69 | VI |
| tert-butyl | do | $-CH_2-$ | 1 | $-C_{18}H_{37}$ | 56–58 | |
| Do | do | $-CH_2-$ | 1 | $-CH_3$ | 55 | |

Our novel stabilizers have an improved stabilizing effect when compared with known purely organic stabilizers such as the mixtures of alkylated phenols (German DAS 1,035,137) thiobis-phenols, and ω-(hydroxy-alkyl-phenyl)-alkane carboxylic acid esters (German DAS 1,201,349); they are also more effective than the thiobisphenols which have been considered to belong to the best stabilizers of the type here involved.

The following examples illustrating the stabilizing effect of the new stabilizers are merely illustrative and are not intended to limit the invention to the specific materials and details disclosed.

EXAMPLE 1

Stabilization of polypropylene

To 100 parts each of unstabilized polypropylene powder, the stabilizers listed in Table II were added. All mixtures were treated for 10 minutes at 180° C. on a laboratory roll mill, and the obtained films were pressed at 200 atm. and at a temperature of 210° C. From the obtained 1 mm. thick sheets, 5 strips were cut out and subjected by storage in a drying cabinet at 150° C. to an accelerated ageing; the time was determined after which an oxidative decomposition could be observed by the brittleness test.

TABLE III

| Stabilizer (Parts by weight): | Oxidative degradation after days (Brittleness test) |
|---|---|
| 0.5 L | 45 |
| 0.2 L+0.3 DLTDP | 72 |
| 0.5 M | 65 |
| 0.5 Stabilizer I | 100 |
| 0.5 Stabilizer V | 110 |

Stabilizer L=4,4′-thiobis-(6-tert.butyl-m-cresol); Stabilizer M=β-(3,5-di-tert.butyl-4-hydroxy-phenyl)-propionic acid stearate; DLTP=dilaurylthiodipropionate.

Stabilizer I and V see Table I. In the films stabilized with said stabilizers, the oxidative degradation started later than in the films stabilized with the known stabilizers.

EXAMPLE 2

Stabilization of an ABS resin

Three mixtures (Table IV) were prepared, each from 100 parts by weight of ABS with 2 parts of 1,2-bis-stearoylaminoethane as lubricant and 0.5 part of stabilizer. The mixtures were rolled on a laboratory roller mill for 10 minutes at 160° C., and the obtained films were pressed at a pressure of 200 atm. at a temperature of 180° C. to sheets of 1 mm. thickness. Test specimens cut from said sheets were stored in a drying cabinet at 110° C. to produce accelerating ageing, and the effect of the stabilizers was determined by the discoloration and brittleness of the specimens.

TABLE IV

| Stabilizer (parts by weight) | Color after 30 days | Brittleness starting after (days)— |
|---|---|---|
| 0.25 2,5-di-tert.butyl-p-cresol<br>0.25 2,6-dimethylphenol | } Brown | 47 |
| 0.5 Stabilizer L | do | 49 |
| 0.5 Stabilizer I | Light brown | 55 |

The stabilizer of the invention shows distinctly a better effect.

EXAMPLE 3

Stabilization of polyamide (condensation products of dicarboxylic acids and diamines)

The four mixtures listed in Table V were prepared each from 100 parts of polyamide and 1 part of stabilizer and extruded at 250° C. to sheets from which samples were cut and subjected to accelerated ageing in a drying cabinet at 140° C.

The stabilizing effect was determined by the brittleness test and the color of the samples.

TABLE V

| Stabilizer (parts by weight) | Color at begin of ageing | Brittleness starting after (days)— |
|---|---|---|
| 1 Stabilizer L | Brown | 34 |
| 0.5 2,6-di-tert.butyl-p-cresol<br>0.5 2,6-dimethylphenol | do | 17 |
| 1 Stabilizer M | do | 29 |
| 1 Stabilizer I | Yellow | 30 |
| 0.5 Stabilizer II<br>0.5 tris-nonylphenyl phosphite | Pale yellow | 42 |
| 1 Stabilizer IV | Brown | 45 |

Particularly in combination with aryl phosphites, the stabilizers of the invention show a superior stabilizing effect.

EXAMPLE 4

Stabilization of mineral oil (Gardner color) number 3–4, viscosity 144 cps. at 20° C.

100 g. each of a mineral oil were mixed with the stabilizers listed in Table VI, and 5 liters of oxygen were passed through the oil for 90 minutes at 190° C. The oxidative degradation of the oil was determined by the viscosity increase.

TABLE VI

Stabilizer:                Viscosity, cps. at 20° C.
  0.05 g. 2,4,6-tri-tert. butyl phenol, 0.05 g. 2,4-
    dimethylphenol _____ 188
  0.1 g. stabilizer M _____ 192
  0.1 g. stabilizer VI _____ 165
  0.05 g. stabilizer III, 0.05 g. tris-nonylphenyl-
    phosphite _____ 160

The stabilizers of the invention (III and VI) retard best the oxidative degradation of the oil. As shown by the table, their addition resulted in the smallest viscosity increase.

EXAMPLE 5

Stabilization of vegetable oils and plasticizers

The same stabilizers as employed in Table V were used in a similar manner for a vegetable oil (olive oil) and a plasticizer (dioctylphthalate). The results were similar to those obtained with the mineral oil.

We claim:

1. As new compounds (hydroxydialkyl-benzyl) mercapto alkane carboxylic acid esters of the formulae:

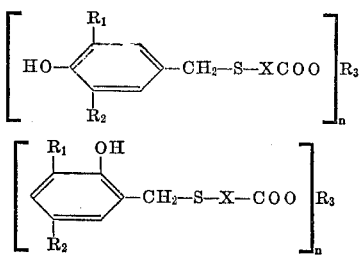

and

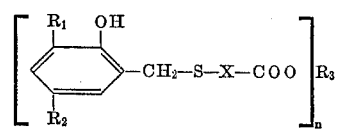

wherein $n$ is an integer from 1 to 4, $R_1$ and $R_2$ are alkyl having 1 to 6 carbons, $R_3$ for $n=1$ is a member of the group consisting of alkyloxyalkyl, alkylthioalkyl and alkyl radicals having up to 20 carbon atoms and $R_3$ for $n=2$ is alkdiyl having up to 10 carbon atoms, $R_3$ for $n=3$ is alktriyl having up to 10 carbon atoms, and $R_2$ for $n=4$ is alktetrayl having up to 10 carbon atoms, and X is a lower alkylene.

2. A compound of claim 1 corresponding to the formula

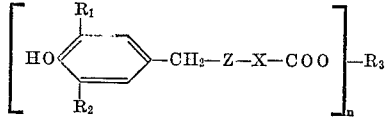

wherein $n$ is 1, 2 or 4, $R_1$ and $R_2$ are selected from the group consisting of methyl, isopropyl and tertiary butyl, $R_3$ for $n=1$ is selected from the group consisting of methyl, octyl, decyl, octadecyl, eicosyl, butoxyethyl, ethylthioethyl, benzyl and cyclohexyl, for $n=2$, $R_3$ is selected from the group consisting of tetramethylene and 2,2-diethylpropylene, and for $n=4$, $R_2$ is

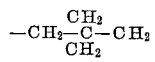

and X is selected from the group consisting of methylene, ethylene and methylmethylene.

3. A compound of claim 1 corresponding to the formula

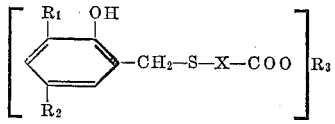

wherein $R_1$ and $R_2$ are selected from the group consisting of methyl and tertiary butyl, $R_3$ is an alkyl having 1 to 18 carbons and X is methylene.

4. The compound of claim 2 wherein $R_1$ and $R_2$ are methyl, $n$ is 1, and $R_3$ is selected from the group consisting of octyl, decyl, octadecyl and ethylthioethyl and X is methylene.

5. The compound of claim 2 wherein $R_1$ and $R_2$ are isopropyl, $n$ is 1, $R_3$ is octadecyl and X is methylene.

6. The compound of claim 2 wherein $R_1$ and $R_2$ are methyl, $n$ is 2, $R_3$ is tetramethylene and X is methylene.

7. The compound of claim 3 wherein $R_1$ is methyl, $R_2$ is tertiary butyl, $R_3$ is octadecyl and X is methylene.

References Cited

UNITED STATES PATENTS

| 3,546,272 | 12/1970 | Braus et al. | 260—470 |
| 3,504,012 | 5/1970 | Braus et al. | 260—470 |
| 3,285,855 | 11/1966 | Dexter | 252—57 |
| 3,249,632 | 4/1966 | Peterson | 260—473 |
| 3,144,422 | 8/1964 | Homberg | 260—23 |

LORRAINE A. WEINBERGER, Primary Examiner

E. J. GLEIMAN, Assistant Examiner

U.S. Cl. X.R.

99—163; 260—45.85